Sept. 15, 1959　　　　　　　J. KRITZ　　　　　　2,903,884
DENSITOMETER
Filed May 10, 1955
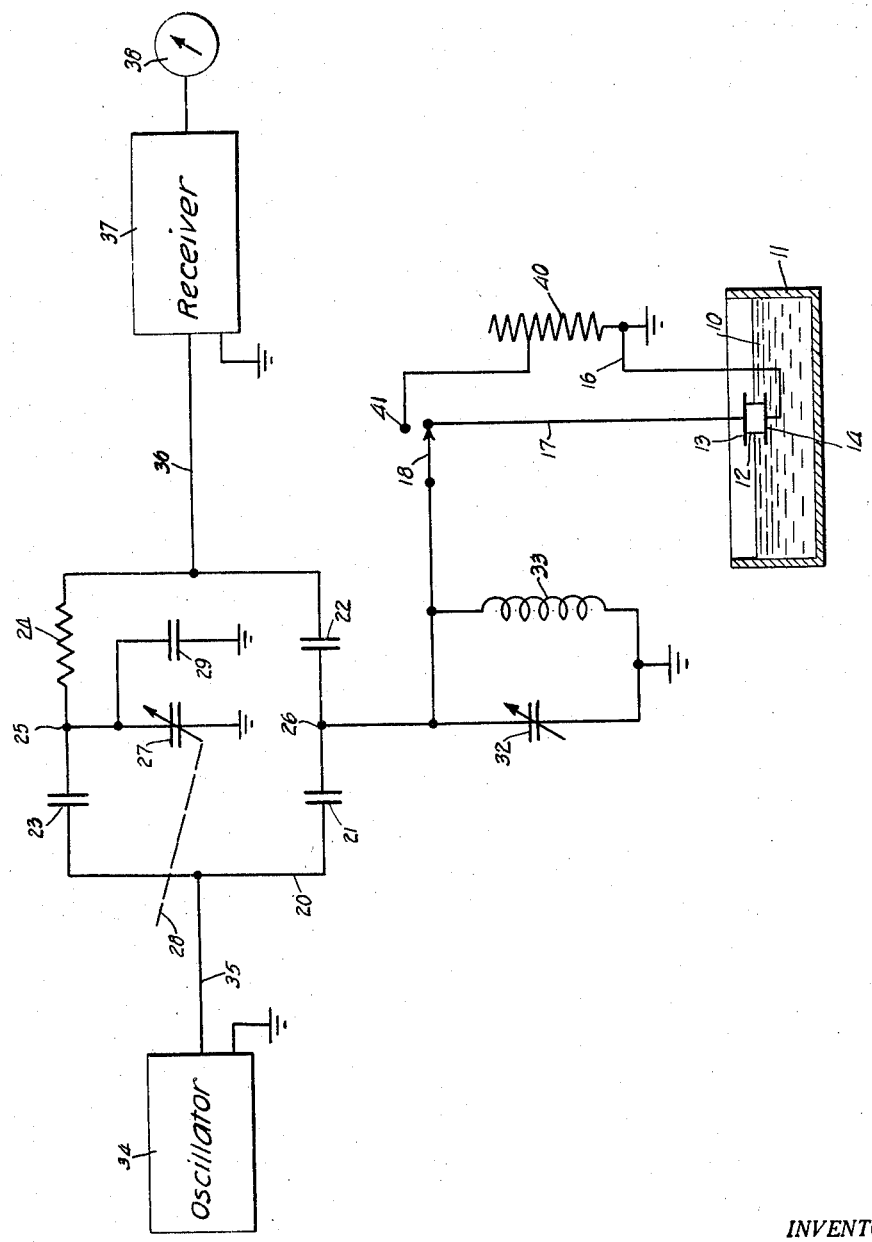
INVENTOR.
Jack Kritz
BY
Mosen, Nolte, Cruse & Berry
ATTORNEYS

United States Patent Office 2,903,884
Patented Sept. 15, 1959

2,903,884
DENSITOMETER
Jack Kritz, Flushing, N.Y.
Application May 10, 1955, Serial No. 507,307
4 Claims. (Cl. 73—32)

The present invention relates to an apparatus and method for measuring the density of any medium, although the invention will be described particularly with reference to a fluid medium.

The acoustic impedance of any fluid may be expressed as a function of the density, $\rho$, of the fluid. More particularly, the acoustic impedance is equal to $\rho v$, where $v$ is the propagation velocity of acoustic waves in the fluid. According to the present invention a measurement of the density of a fluid is obtained by producing an electrical quantity having a component which is a function of the acoustic impedance and hence of the density of the fluid, then separating said component and determining its value independently of the remainder of said electrical quantity.

According to the embodiment of the invention, an electroacoustic transducer is placed in acoustic contact with the fluid and the resistive component of the transducer is measured independently of the reactive component of its impedance. The transducer may be a piezo-electric crystal adapted to oscillate in a longitudinal mode. Electrical oscillations having a frequency corresponding to one of the resonant frequencies of the crystal are impressed thereon. A circuit is connected to the crystal having means for producing a measurement of only the resistive component of the crystal. This circuit, according to the particular example of the invention illustrated herein, is a twin-T impedance bridge. The bridge is provided with a null indicator, which may be a receiver having an indicating instrument connected to the output of its detector. The crystal is connected in a shunt arm of the bridge and the bridge is designed so that an element in one arm thereof, for example, in said shunt arm is adjustable for balancing the bridge with respect to the reactive component of the crystal. Another variable element of the bridge, which may be in another portion of the shunt arm of the bridge, is adjustable for balancing the bridge with respect to the resistive component of the crystal. The latter bridge element may be a capacitor having a rotor shaft and designed so that the rotation of the shaft is proportional to the capacity. The bridge is designed so that the position of the shaft will then be proportional to the conductance of the crystal, and the conductance in turn will be substantially proportional to the reciprocal of the acoustic impedance. The shaft position is, therefore, a measure of the acoustic impedance and hence the density of the liquid, and the shaft position may be used to establish an electrical quantity, such as a resistance, which constitutes a measure of the density of the liquid.

A measurement of the density of a liquid may be made by first balancing the bridge with the crystal out of the liquid. The crystal is then immersed in the liquid so that at least one of its major faces is in contact with the liquid. The bridge is then balanced again. The rotation of the shaft of the conductance balancing condenser is then a measure of the density of the liquid.

Various objects, features and advantages of the invention will become apparent upon reading the following specification together with the accompanying drawing forming a part hereof.

Referring to the drawing:
The single figure is a diagram illustrating an examplary embodiment of the invention.

Referring to the drawing, the liquid 10, the density of which is to be measured, is in a container 11 which may be a tank, pipe, duct or other vessel. A piezo-electric crystal transducer 12, is adapted to be mounted in the liquid container in acoustic contact with the liquid. The crystal may be mounted so that at least one face of the crystal is in contact with the liquid 10. The opposite face of the crystal may then be exposed to the atmosphere. However, if the liquid is non-conductive, the crystal may be completely immersed in the liquid. The crystal is oriented preferably so that there is substantially no reflection of acoustic waves back to the crystal. The crystal 12 has electrodes 13 and 14 on its opposite faces and is adapted to vibrate in a longitudinal mode at one of its resonant frequencies, at which the crystal is an odd number of half wavelengths long, for example, one half wavelength long. A lead 16 connects the electrode 14 to ground while a lead 17 connects electrode 13 to an impedance bridge 20 through a switch 18.

The impedance bridge 20 is of the twin-T type. It comprises a series branch formed of capacitors 21 and 22 which are preferably equal and a second series branch including capacitor 23 and resistor 24. A shunt arm of the bridge is effectively connected between the junction points 25 and 26 on the series branches. The shunt arm portion connected to junction point 25 consists of a variable capacitor 27 one side of which is connected to ground. Capacitor 27 is of the type having a rotor mounted on a shaft 28, which shaft may be provided with any suitable means for indicating the rotation or position of the shaft, as is conventional. The condenser 27 may be connected in parallel with another condenser 29 to permit condenser 27 to work over a greater portion of its range. The capacitance of condenser 27 has a linear relationship to the rotation of its shaft 28.

The second shunt portion of the bridge connected between junction point 26 and ground consists of a variable condenser 32 in parallel with an inductance 33, and the crystal 12 is connected across this condenser and inductance. The condenser 32 is variable and is adjusted to balance the bridge with respect to the reactive components of impedance.

An oscillator 34 is connected by a lead 35 to one end of the series arms of the bridge 20 for supplying high frequency oscillations to the bridge and the crystal. The other side of the series arms of the bridge has a connection 36 to a null indicator, which may consist of a receiver 37 provided with a meter 38 or other indicator.

A calibrated resistor 40 may be connected between one terminal 41 of switch 18 and ground. Resistor 40, which is variable, can thus be substituted for the crystal. Resistor 40 may be used for calibrating the bridge, or, more particularly, for calibrating or checking the readings indicated by the position of shaft 28. After a measurement has been made the resistor 40 may be switched into the circuit and adjusted to the value required to null the bridge without changing the setting of capacitor 27. In this manner resistor 40 may be set to a resistance value equal to the resistive component of the crystal impedance.

The operation of the circuit may be explained as follows: The driving point impedance Z of a crystal at a frequency $w$ at which the wave length is twice the length of the crystal, assuming that no acoustic wave reflections from the interior of the liquid container occur, is given by the equation:

$$Z = \frac{1}{jwc} + \frac{K}{w^2 \rho v} \tag{1}$$

where $c$ = crystal capacity
$\rho$ = liquid density
$v$ = velocity of propagation in liquid
$K$ = a real function of the crystal.

For liquids the imaginary part of Z is sufficiently greater than the real part to make it permissible to write for the conductance G $$G = \frac{REAL}{(REAL)^2 + (IMAGINARY)^2} \approx \frac{REAL}{(IMAGINARY)^2}$$

$$G \approx \frac{KC^2}{pv} \quad (2)$$

This approximation can be made more precise by operating the crystal in an odd harmonic mode, for example the 3/2 wavelength mode, instead of the fundamental mode. The conductance G is in shunt with a susceptance $$B = jwC$$

A circuit analysis of the bridge shows that at balance the resistance $R_0$ effectively in shunt with the arm of the bridge consisting of elements 32, 33 and crystal 12 is given by the equation $$R_0 = \frac{1}{w^2 R_{24} C_{21}^2 \left(1 + \frac{C_2}{C_{23}}\right)}$$

where $C_2$ is the capacitance of condensers 27 and 29. Then $$G_0 = w^2 R_{24} C_{21}^2 \left(1 + \frac{C_2}{C_{23}}\right)$$

and $$\Delta G_0 = \left(\frac{w^2 R_{24} C_{21}^2}{C_{23}}\right) \Delta C_2 \quad (3)$$

Connecting the immersed crystal to the bridge adds a conductance G or ΔG which unbalances the bridge. The bridge is re-balanced by adjusting the capacitance $C_2$ and Equation 3 shows that the change of $C_2$ is proportional to the change in G. If the capacitance $C_2$ is a linear function of the rotation of shaft 28, then the shaft rotation will be proportional to the conductance of the crystal. Since the conductance G is proportional to the reciprocal of the density of the liquid, it is evident that the amount of rotation of the shaft 28 is also a measure of the density of the liquid.

In one particular embodiment of the invention the frequency of oscillator 34 was 10 mc. Capacitors 21, 22 and 23 were 15 mmf., capacitors 27 and 32 had a maximum capacity of 30 mmf., capacitor 29 was 22 mmf., resistor 24 was 50 ohms and inductance 33 was 2.3 microhenries and had a Q equal to 220.

The operation of the apparatus is as follows: The bridge is energized by oscillator 34 and capacitors 27 and 32 are adjusted until the meter 38 indicates a null and that the bridge is balanced. The crystal is then immersed in the liquid and the capacitors 32 and 27 are readjusted to balance the bridge again. The rotation of shaft 28 required to rebalance the bridge is noted. The position of the shaft may be calibrated in terms of liquid density or acoustic impedance by previously measuring a liquid of known density or known acoustic impedance. The density of other liquids may then be determined if their propagation velocities are known. If resistor 40 is switched into the circuit, it may be set to the value of the resistive component of the crystal by adjusting the resistor and condenser 32 to the positions at which the bridge becomes nulled again.

I have described one preferred embodiment of my invention, but it will be evident that many changes and modifications may be made within the spirit and scope of my invention as defined by the following claims:

I claim:

1. A densitometer comprising a fluid medium the density of which is to be measured, electroacoustic means for measuring the acoustic impedance of the fluid, said means comprising a piezoelectric crystal slab having one face immersed in the fluid and its opposite face exposed to the atmosphere, means for impressing on the crystal electrical oscillations having a frequency substantially equal to a resonant frequency of the crystal, and a circuit connected to the crystal, said circuit including means for measuring the resistance introduced into said circuit by said crystal, said measuring means including a tuned circuit connected in parallel with said crystal, a variable calibrated resistor, means for disconnecting the crystal and connecting the variable resistor in place of the crystal and means for indicating the adjustment of the variable resistor to a value equal to the effective resistance of the crystal.

2. A densitometer for measuring the density of a liquid, comprising an electroacoustic means for measuring the acoustic impedance of the liquid, said means including a piezoelectric crystal in the form of a slab, one major face of said slab being in acoustic contact with said liquid, a source of high frequency electrical oscillations, means for connecting said source to said crystal for vibrating the crystal, and means for measuring an electrical quantity substantially proportional to the resistive component of the vibrating crystal, said crystal having a length equal to an odd integral multiple greater than one of one-half the wavelength of said oscillations.

3. A densitometer for measuring the density of a liquid, comprising an electroacoustic means for measuring the acoustic impedance of the liquid, said means including a piezoelectric crystal in acoustic contact with the liquid, means including an ultrasonic frequency generator connected to the crystal for vibrating said crystal at a resonant frequency thereof and in a longitudinal mode, a rotatable shaft having its angular positions calibrated in terms of liquid density, a variable impedance element connected to said shaft for variation of its impedance in accordance with the rotation of said shaft, and circuit means interconnecting said impedance element and said crystal for enabling a change in the effective impedance of the crystal to be counterbalanced by a change in the impedance of said impedance element, and means connected to said circuit means for indicating when said circuit means is balanced, whereby the angular position of the shaft indicates the density of the liquid.

4. A densitometer for measuring the density of a fluid, comprising a piezoelectric crystal immersed in the fluid, a twin-T bridge having a shunt arm comprising two portions, said crystal being connected across one shunt arm portion of the bridge, means for producing ultrasonic frequency electrical oscillations connected to said bridge for vibrating said crystal at a resonant frequency thereof in a longitudinal mode, null indicating means connected to said bridge for indicating balance of said bridge, the other shunt arm portion including a variable capacitor having a rotating shaft for varying the capacity thereof, the angular positions of said shaft being calibrated in terms of liquid density, the parameters of said bridge being such that the angular position of said shaft is proportional to the conductance of the crystal when the bridge is in balanced condition.

References Cited in the file of this patent

UNITED STATES PATENTS

| 2,150,015 | Witham | Mar. 7, 1939 |
| 2,294,941 | Tuttle | Sept. 8, 1942 |
| 2,376,394 | Sinclair | May 22, 1945 |
| 2,661,714 | Greenwood | Dec. 8, 1953 |
| 2,711,646 | Mendousse | June 28, 1955 |

FOREIGN PATENTS

| 265,181 | Great Britain | Jan. 26, 1928 |
| 352,040 | Great Britain | June 29, 1931 |

OTHER REFERENCES

Metal Bond Tester, WADC TR 54–231, pt. 3, pages 1–3, 7 and 10; pulished April 1955.